May 24, 1955  G. VARNEY  2,708,888
UNIVERSAL DRIVE SHAFT CONNECTION
Filed March 4, 1950
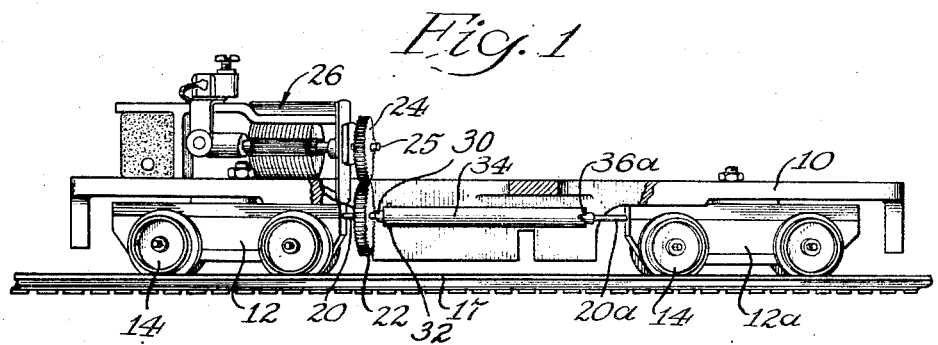
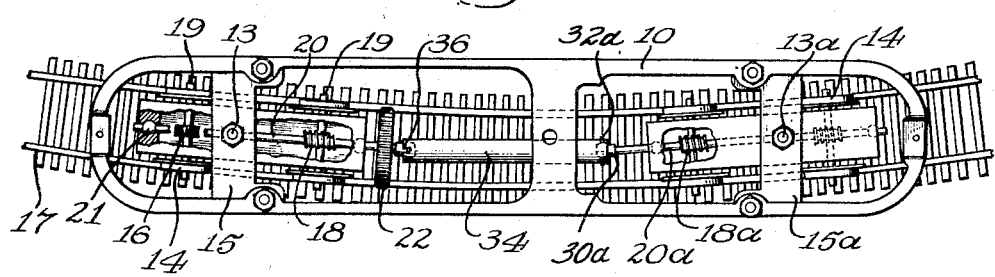
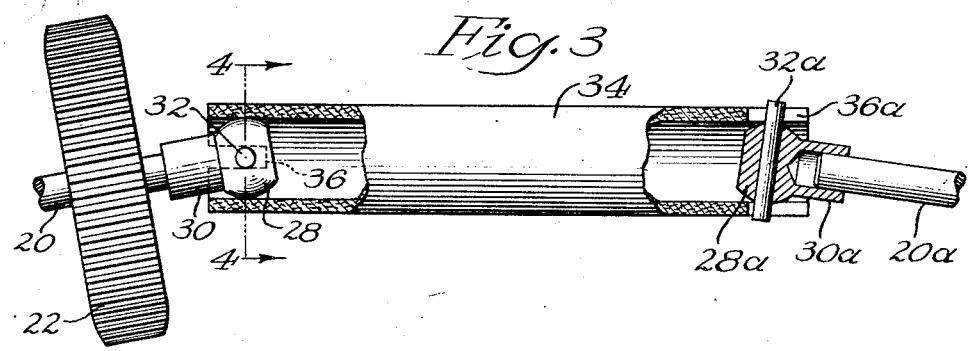
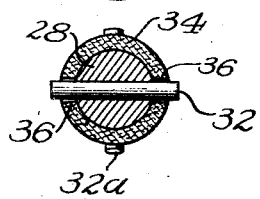
Inventor
Gordon Varney
By Bair, Freeman & Molinare
Attys.

United States Patent Office 2,708,888
Patented May 24, 1955

2,708,888

UNIVERSAL DRIVE SHAFT CONNECTION

Gordon Varney, Chicago, Ill.

Application March 4, 1950, Serial No. 147,750

1 Claim. (Cl. 105—99)

This invention relates to a universal drive shaft connection particularly adapted for model railroad locomotives and the like.

One object of the invention is to provide a drive connection which is simple and inexpensive to manufacture and which makes possible the driving of both trucks of a locomotive, or three or more trucks if desired.

Another object is to provide a drive connection between two adjacent trucks which permits the trucks to articulate when traversing a curve of the road bed yet continues the drive from one to the other without any binding action accomplished with a drive connection which does not require any support intermediate the shafts which are journalled in the trucks.

A further object is to provide a drive connection comprising universal joints between the ends of drive shafts of two adjacent trucks, and an intermediate drive tube, the coaction between the shafts and the tube being such as to permit flexibility of action without loss of driving power from one truck to the next one during articulation of the trucks.

With these and other objects in view, my invention consists in the construction, arrangement and combination of the various parts of my universal drive shaft connection, whereby the objects contemplated are attained, as hereinafter more fully set forth, pointed out in my claims and illustrated in the accompanying drawings, wherein:

Figure 1 is a side elevation of a locomotive frame mounted on a pair of trucks, one truck being driven by an electric motor and the other driven through my flexible universal drive shaft connection from the first one, the trucks being illustrated traversing a curve of a road bed, and a portion of the near-side frame element being broken away to illustrate the same.

Figure 2 is a plan view of Figure 1 with the motor omitted.

Figure 3 is an enlarged view of the drive shaft connection with portions broken away and other portions shown in section; and Figure 4 is a sectional view on line 4—4 of Figure 1.

On the accompanying drawing I have used the reference numeral 10 to indicate a frame of a model railroad locomotive or the like. A truck 12 is pivoted at 13 on a cross bar 15 of the frame and a second truck 12a is similarly pivoted at 13a on a cross bar 15a thereof. The trucks 12 and 12a are provided with flanged wheels 14 in the usual manner adapted to travel on tracks 17.

The wheels 14 of the truck 12 are mounted on axles 19 and these axles are provided at their centers with worm gears 16. A worm shaft 20 is mounted longitudinally of the truck 12 and suitably journalled therein as in bearings 21. The shaft 20 carries worms 18 meshing with the worm gear 16. Beyond one end of the truck 12 a gear 22 on the shaft 20 meshes with a gear 24 which latter gear is on the shaft 25 of the an electric motor or other power means 26. Obviously rotation on the shaft 25 will rotate the worms 18 for imparting rotation to the wheels 14 of the truck 12 at a reduced speed.

Heretofore locomotives of the general character described provided drives for only the one truck 12. Often, however, as when a great number of cars are pulled behind the locomotive, there is not enough traction and it is therefore desirable to drive the wheels 14 of the truck 12a also. For this purpose I have provided the following described mechanism.

A universal drive shaft connection is provided comprising a ball 28 having a hub 30 press fitted or pinned on the end of the worm shaft 20 beyond the gear 22. A similar ball 28a has a hub 30 mounted on the worm shaft 20a of the truck 12a which, in the respect that it has worm gear drives for the wheels, is of the same construction as the truck 12.

The balls 28 and 28a are provided with cross pins 32 and 32a and these are operatively connected with a tube 34 formed of fibre or the like by means of slots 36 and 36a in the ends thereof receiving the pins as best illustrated in Figures 3 and 4. The slots are preferably 90 degrees from each other around the circumference of the tube and of sufficient length to avoid striking the ends of the pins 32 and 32a in the extreme angular positions of the worm shafts 20 and 20a as shown in Figure 3.

At the same time the length of the slots 36 and 36a is such as to never permit the pins to pull out of the ends of the slots and with such an arrangement the tube 34 is entirely supported by the balls 28 and 28a. This eliminates the necessity of any intermediate bearings for supporting the tube 34 and makes for a very simple yet positive drive connection between the truck 12 and the truck 12a.

An arrangement of the character disclosed is particularly adaptable for model railroad locomotives and other equipment requiring drives with more traction than possible with one truck alone. Obivously additional trucks can be driven by further units of the universal drive shaft between the truck 12 or 12a and the additional trucks. The tube 34 made of fibre or the like is relatively light and its weight therefore is not prohibitive when carried only by the worm shaft ends which entirely support it.

Some changes may be made in the construction and arrangement of the parts of my universal drive shaft connection without departing from the real spirit and purpose of my invention, and it is my intention to cover by my claim any modified forms of structure or use of mechanical equivalents which may be reasonably included within their scope.

I claim as my invention:

A model locomotive having a pair of articulated, plural-axle, wheel-mounted trucks, a single worm shaft rotatably carried by each truck for driving the axles thereof, a universal drive shaft connection between said worm shafts comprising ball heads carried by the ends of said shafts, said ball heads being a predetermined distance apart when said shafts are aligned and further apart when said shafts are out of alignment, cross pins carried by said ball heads, and a tube receiving said ball heads in its ends, said tube being entirely carried by said ball heads, spanning the space between them and having open-end slots in its opposite ends receiving said cross pins, said slots being longer than the diameter of said pins, whereby said pins will slide in said slots when the tube assumes an angular relation to said drive shafts.

References Cited in the file of this patent

UNITED STATES PATENTS

| 972,270 | Smith | Oct. 11, 1910 |
| 1,907,391 | Rudolph | May 2, 1933 |
| 2,595,936 | Goode | May 6, 1952 |

FOREIGN PATENTS

| 320,594 | Great Britain | Oct. 17, 1929 |
| 413,860 | France | June 4, 1910 |
| 837,104 | France | Feb. 2, 1939 |